United States Patent [19]
Declercq

[11] Patent Number: 5,997,294
[45] Date of Patent: Dec. 7, 1999

[54] MACHINE FOR PERFORMING IN-LINE TREATMENT ON CONTAINERS, AND A PNEUMATIC CONTAINER-TRANSFER LINE EQUIPPED WITH SUCH A MACHINE

[75] Inventor: Philippe Declercq, La Madeleine, France

[73] Assignee: Netra Systems, SA, Marcq en Baroeul, France

[21] Appl. No.: 08/972,067

[22] Filed: Nov. 17, 1997

[30] Foreign Application Priority Data

Nov. 18, 1996 [FR] France .................................. 96 14247

[51] Int. Cl.⁶ ...................................... B65B 1/04
[52] U.S. Cl. .............................. 432/224; 141/85
[58] Field of Search ...................... 432/224, 141, 432/121, 124; 99/359, 360, 361, 362; 422/307; 414/150; 141/69, 85

[56] References Cited

U.S. PATENT DOCUMENTS

| | | | |
|---|---|---|---|
| 5,143,199 | 9/1992 | Evans | 198/418.1 |
| 5,766,002 | 6/1998 | Silvestrini | 432/121 |

FOREIGN PATENT DOCUMENTS

| | | |
|---|---|---|
| 0 485 344 A2 | 5/1992 | European Pat. Off. . |
| 0 486 360 A1 | 5/1992 | European Pat. Off. . |
| 0 540 905 A1 | 5/1993 | European Pat. Off. . |

*Primary Examiner*—Philip H. Leung
*Assistant Examiner*—Gregory A. Wilson
*Attorney, Agent, or Firm*—Wolf, Greenfield & Sacks, P.C.

[57] ABSTRACT

The machine for performing in-line treatment on containers comprises a treatment enclosure with a loading path for loading a row of containers and an unloading path for unloading a row of containers, the two paths being distinct from each other, and a carrousel of the first-in-first-out type, which carrousel firstly includes a plurality of mutually equidistant successive moving rails, each rail being designed to receive one row of containers, and means for moving the set of moving rails, and secondly is mounted inside the enclosure so that successive rows of containers can be transferred from the loading path to the unloading path of the enclosure. The carrousel is further equipped with regulation means which are designed to cause the set of moving rails to advance in successive steps at a given rate so that the transit time taken by each rail to travel from the loading path to the unloading path is substantially equal to a predetermined duration.

12 Claims, 3 Drawing Sheets

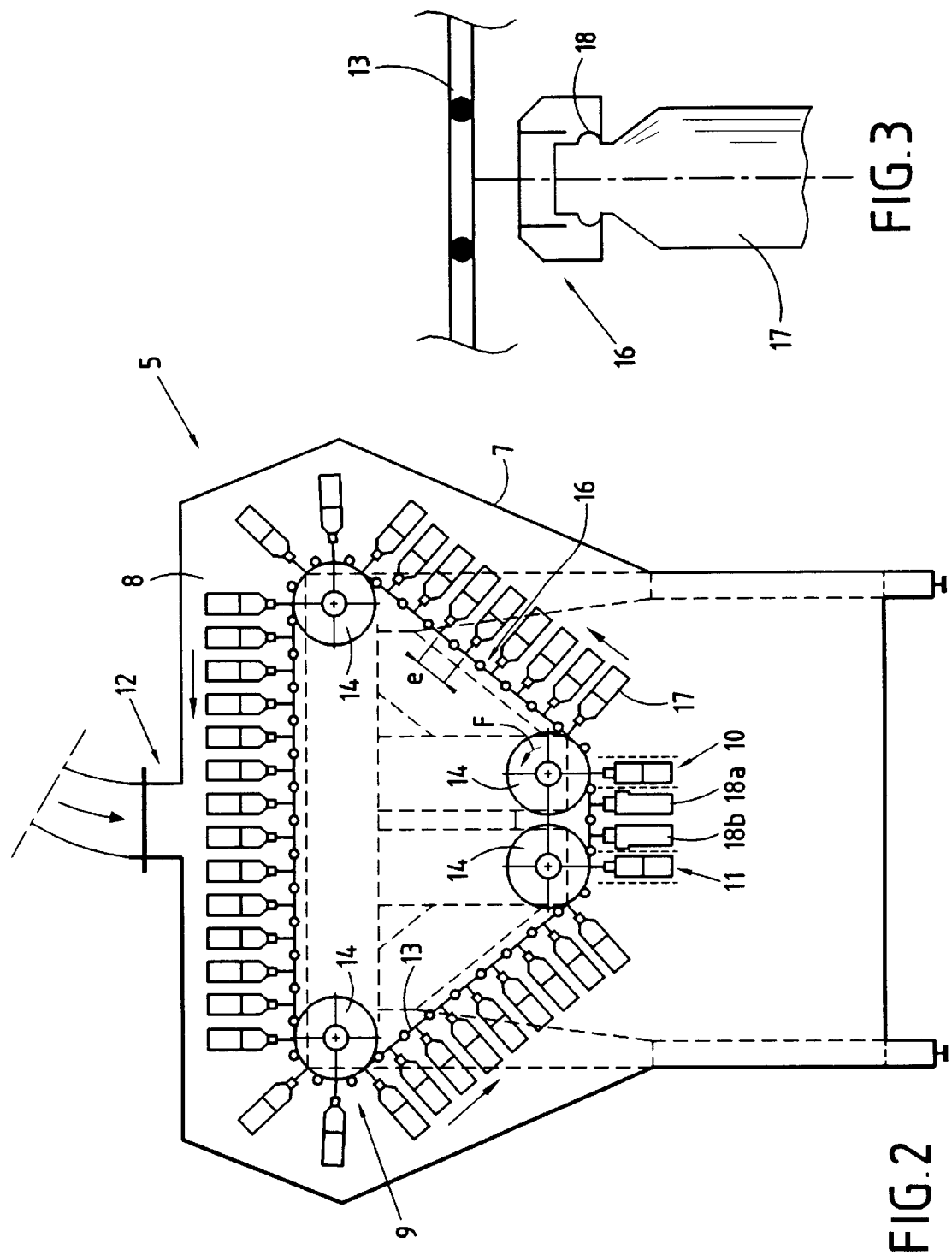

MACHINE FOR PERFORMING IN-LINE TREATMENT ON CONTAINERS, AND A PNEUMATIC CONTAINER-TRANSFER LINE EQUIPPED WITH SUCH A MACHINE

The present invention relates to applying in-line treatment to containers and more particularly bottles in a pneumatic transfer line between an upstream machine, such as a machine for manufacturing said containers, and a downstream machine, such as for example a filling machine. The invention relates more particularly to a machine enabling in-line treatment to be performed on containers for a determined duration, and to a pneumatic container-transfer line equipped with such a machine.

BACKGROUND OF THE INVENTION

In the bottling industry, containers, and in particular bottles made of a plastics material of the PET or PVC type are conventionally transported via a pneumatic path between an upstream machine for manufacturing said containers by blow-molding, and a downstream machine for filling said containers. More particularly, such transfer lines implement pneumatic conveyors in which the containers are suspended via projections on their necks and are pushed one behind the other under the action of air jets. In practice, the output rates of such pneumatic transfer lines lie in the range 10,000 containers per hour to 60,000 containers per hour.

Clearly, for reasons of hygiene, it is necessary in such bottling lines to ensure that the insides of the containers are not contaminated with bacteria prior to being filled. For this purpose, it is possible, for example, to inject a disinfectant into the containers while they are being transferred pneumatically, it then being necessary to maintain said disinfectant at a determined temperature for a predetermined optimum duration, e.g. at 50° C. for ten minutes. In which case, it is necessary to make sure that each container containing the disinfectant is maintained at this temperature for an actual duration that remains in the range set by a maximum duration that should not be exceeded and by a minimum duration below which the action of the disinfectant is not effective enough.

OBJECTS AND SUMMARY OF THE INVENTION

An object of the present invention is to provide a machine that can be interposed in the container-transfer line, and that enables the containers to be treated in-line for a controlled predetermined duration.

This object is achieved by the machine of the invention for performing in-line treatment on containers, which machine comprises a treatment enclosure with a loading path for loading a row of containers and an unloading path for unloading a row of containers, the two paths being distinct from each other, and a carrousel of the first-in-first-out type; the carrousel includes a plurality of mutually equidistant successive moving rails, each rail being designed to receive one row of containers, and means for moving the set of moving rails; the carrousel is mounted inside the enclosure so that successive rows of containers can be transferred from the loading path to the unloading path of the enclosure; the carrousel is further equipped with regulation means which are designed to cause the set of moving rails to advance in successive steps at a given rate so that the transit time taken by each rail to travel from the loading path to the unloading path is substantially equal to a predetermined duration.

In the field of bottling, carrousels have already been proposed that enable containers to be stored in-line temporarily and dynamically. Such carrousels are interposed along the route taken by the containers between an upstream machine and a downstream machine. The purpose of such carrousels is quite different from the purpose of the carrousel used in the treatment machine of the invention, given that prior carrousels are designed to absorb momentary stoppages of the upstream machine or of downstream machine, so that the upstream machine and the downstream machine do not affect each other in the event that they break down. The function of such prior carrousels is thus to off-load the transfer line by temporarily storing containers in the event of stoppage or slow-down of the downstream machine, and to re-load the transfer line with the temporarily stored containers once the downstream machine has started up again or is operating normally again, or else in the event of accidental stoppage or slow-down of the upstream machine, in order to continue to feed the downstream machine with containers.

In most cases, such temporary dynamic storage carrousels are of the last-in-first-out type such as the carrousel described in European Patent Application EP 485 344. In which case, such a carrousel includes a loading path that coincides with the unloading path. When the transfer line is operating normally, i.e. when the upstream machine and the downstream machine are operating normally, the containers pass through the carrousel without being stored. When the downstream machine is stopped, the carrousel is rotated in a given direction so as to take in one or more successive rows of bottles for the entire duration of the stoppage of the downstream machine. When, for example, the upstream machine stops momentarily while the downstream machine is operating normally, the carrousel is automatically rotated in the reverse direction so as to unload the previously stored successive rows of bottles onto the transfer line and in the reverse order of their arrival in the carrousel.

Using a carrousel of the first-in-first-out type for temporarily and dynamically storing containers in a transfer line is also known but is less common. That type of carrousel has, for example, already been described in European patent application EP.0486360 and is preferably mounted to by-pass the transfer line, the containers thus being transported to the inlet of the carrousel only in the event that the downstream machine stops, and being re-injected into the transfer line at the outlet of the carrousel only in the event that the upstream machine stops.

In all known cases of the use of a carrousel for dynamically and temporarily storing containers on a pneumatic transfer line, and included in the carrousel of European patent application EP.0486360, controlling the rotation of the carrousel is necessarily synchronized with operation of the upstream machine and of the downstream machine. The transit time of a container inside the carrousel cannot therefore be controlled, but rather it depends on unpredictable stoppages of the upstream machine or of the downstream machine. Furthermore, not all of the containers that are transferred between the upstream machine and the downstream machine are stored in the carrousel. For these reasons, it is not possible to use currently known carrousels to ensure that all of the containers transferred from an upstream machine to a downstream machine are subjected to treatment for a controlled predetermined duration while they are being transferred.

In a particular variant embodiment, the machine of the invention is used to apply in-line heat treatment to the containers. In which case, the treatment machine is equipped with heating means enabling the temperature inside the treatment enclosure to be maintained at a given value. This treatment machine is used to disinfect the containers in-line, a disinfectant having been pre-injected into each of the containers upstream from the inlet of the machine.

The invention also provides a line for pneumatically transferring containers between an upstream machine and a downstream machine, which line includes a treatment machine of the invention interposed between the upstream machine and the downstream machine. In the transfer line of the invention, when the downstream machine stops momentarily, there is a risk that the outlet of the treatment machine might become blocked because of the presence of containers held up at the inlet of the downstream machine. In which case, if the stoppage of the downstream machine continues, it is no longer possible, by controlling the movement of the carrousel of the treatment machine of the invention, to ensure that the treatment duration does not exceed the set duration. If such an incident occurs, it is therefore necessary to unload the treatment machine either manually or automatically via an auxiliary exit provided for this purpose. To prevent such an incident from occurring, i.e. to prevent the treatment machine from being blocked in the event that the downstream machine stops, the pneumatic transfer line of the invention preferably includes a device for dynamically storing containers, which device is mounted between the outlet of the treatment machine and the inlet of the downstream machine, the function of the device being to off-load the transfer line in the event that the downstream machine is stopped. This dynamic storage device may, for example, be of the last-in-first-out type such as, for example, the device described in European Patent Application EP 485 344.

BRIEF DESCRIPTION OF THE DRAWINGS

Other characteristics and advantages of the invention will appear more clearly on reading the following description of a particular variant embodiment of a machine of the invention for performing in-line heat treatment on bottles, and of how it may be implemented in a bottling line, the description being given by way of non-limiting example and with reference to the accompanying drawings, in which:

FIG. 2 is a diagrammatic view of the inside of the treatment machine shown in FIG. 1;

FIG. 3 is a more detailed view of a rail used for transporting a row of bottles inside the treatment machine shown in FIG. 2;

MORE DETAILED DESCRIPTION

Figure 1:
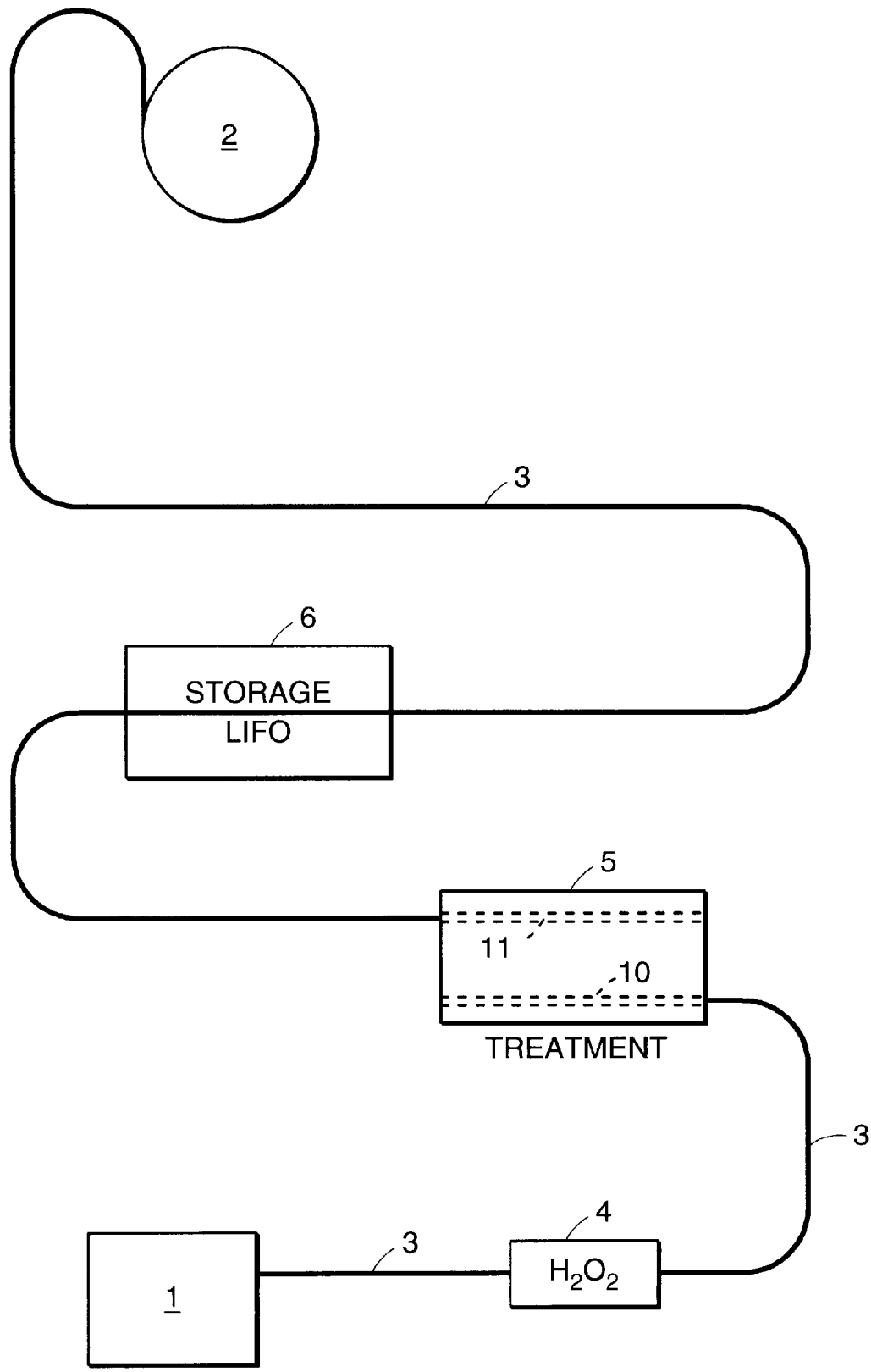
FIG. 1 is a diagram summarizing a bottling line implementing in particular a machine for performing in-line heat treatment on bottles, the machine being combined with dynamic storage means for dynamically storing containers, which storage means are disposed downstream from the treatment machine.

The bottling line shown diagrammatically in FIG. 1 includes, at its upstream end, a bottle-manufacturing machine 1 commonly referred to as a "blow-molder" for manufacturing bottles made of a plastics material, in particular PET or PVC, and at its downstream end, a bottle-filling machine 2 for filling the bottles with drawn-off liquid.

The bottles output by the bottle-manufacturing machine 1 are transported to the bottle-filling machine 2 by means of pneumatic conveyors 3. In conventional manner, each pneumatic conveyor is in the form of a longitudinal box inside which the bottles are conveyed by being suspended via projections on their necks. The box is fed with slightly pressurized air enabling the bottles to be caused to advance one behind the other along the box. This type of pneumatic conveyor is widely used, and is described in particular in European Patent Application EP 070 931 or in U.S. Pat. No. 4,284,370, or else in European Patent Application EP 705 777, those documents being integral parts of the present description.

In the particular example shown in FIG. 1, the empty bottles output by the bottle-manufacturing machine 1 are transported to a first machine 4 at which a disinfectant is automatically injected in-line into the bottles and each bottle is stoppered. For example, the disinfectant may be hydrogen peroxide. The bottles output by the machine 4 are then transported to a machine 5 of the invention for performing in-line heat treatment on the bottles. A detailed description of the structure and operation of this machine 5 is given below with reference to FIGS. 2 to 5.

From the outlet of the treatment machine 5, the disinfected bottles are transported to storage means 6 of the last-in-first-out (LIFO) type. The structure and operation of such storage means are known and are described in particular in European Patent Application EP 485 344 which is an integral part of the present description. It is merely recalled that, under normal operating conditions, i.e. when all of the machines in the bottling line are operating normally, the bottles pass through the storage means 6 without stopping.

On arriving at the downstream machine 2, the bottles are subjected in-line to the following succession of steps. Their stoppers are removed, the disinfectant is rinsed out, and is replaced with the final liquid that the bottles are to contain, and then each bottle is finally closed.

The purpose of the treatment machine 5, of which a particular variant embodiment is described below, is to output disinfected bottles. To this end, the function of the treatment machine 5 is to keep each bottle produced containing the disinfectant in a confined atmosphere heated to a given temperature for a controlled optimum duration, without affecting the output rate of the bottling line, and in particular without interrupting bottle production. The actual transit duration of each bottle in the treatment machine 5 is monitored automatically so as to ensure that it remains in the range set by a predetermined minimum which corresponds to the minimum reaction time of the disinfectant contained in each bottle, and a maximum duration beyond which the disinfectant might spoil or the inside wall of the container might be impregnated irreversibly (it then being impossible to remove the disinfectant merely by rinsing out in machine 2). If, during operation, the actual transit time of the bottles in the treatment machine becomes shorter than the set minimum time, then it is essential to empty the treatment machine by removing the bottles that it contains and that are not sufficiently disinfected, the bottles being removed either manually or automatically via an auxiliary outlet provided for this purpose. In contrast, if the actual transit time of the bottles in the treatment machine becomes longer than the set maximum duration, the decision to re-inject the bottles into the bottling line can be left to the operator.

In the particular example shown in FIG. 2, the treatment machine 5 includes a cover 7 delimiting a confined treatment enclosure 8, with a loading path 10 via which a row of bottles can be loaded, and an unloading path 11. For clearer understanding, the positions of the paths 10 and 11 are represented by dashed lines in FIG. 2. As shown in FIG. 1, the loading path 10 is in alignment with the pneumatic conveyor 3 upstream from the treatment machine 5 whereas the unloading path 11 is in alignment with the pneumatic conveyor 3 enabling the output bottles to be transported to the storage means 6.

A carrousel 9 of the first-in-first-out (FIFO) type is mounted inside the treatment enclosure 8 so that each successive row of bottles inserted into the loading path 10 can be transported in a given time to the unloading path 11. The top of the cover 7 is provided with a pipe 12 for forced injection of hot air into the treatment enclosure 8, the hot air being heated to a given temperature. The bottom of the cover 7 is open so as to enable the air contained in the treatment enclosure 8 to be renewed. The air is renewed in known manner so that the temperature inside the treatment enclosure remains substantially constant. Naturally, these means may be replaced by any equivalent heating means known to a person skilled in the art and enabling the temperature inside the treatment enclosure 8 to be maintained at a given value.

The carrousel 9 of the treatment machine 5 is mounted on a frame shown in dashed lines, and it mainly comprises an endless belt 13 extending over a trapezoidal circuit and tightly mounted on four toothed wheels 14 serving as driving wheels. The four wheels 14 can be driven positively counter-clockwise (arrow F) by being mechanically coupled to a DC motor, and more particularly to a brushless motor referenced 15 in FIG. 4, via a gear box (not shown). Rails 16, uniformly spaced apart in pairs at constant spacing e, are fixed around the entire periphery of the belt 13. Each rail 16 has substantially the same length as that of the loading path 10 and of the unloading path 11, and is designed to serve as a support for one row of bottles 17.

FIG. 3 shows a particular rail profile 16 that is already known, and that enables a row of bottles 17 to be supported via projections 18 on their necks.

As shown in FIG. 2, between the loading path 10 and the unloading path 11, the treatment enclosure 8 is provided with two blower boxes 18a, 18b. Box 18a enables the bottles 11 arriving at the inlet of the loading path to be propelled onto the rail 16 that is aligned with the loading path 10 at a given instant. The box 18b enables the bottles 17 stored on the rail 16 that is aligned with the unloading rail 11 at a given instant to be propelled towards the outlet of the treatment enclosure 8. Because of the presence of the two blower boxes 18a, 18b, the two rails 16 that are located at a given instant between the loading path 10 and the unloading path 11 are not used, and are necessarily empty.

Figure 4:
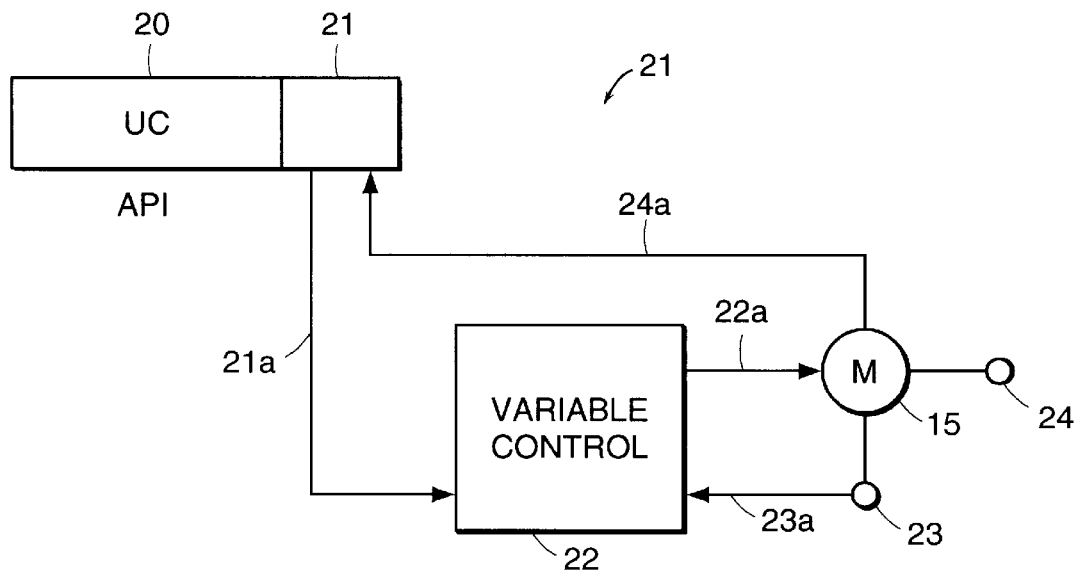
FIG. 4 shows the electronic means for regulating the step-by-step advance of the carrousel of the treatment machine shown in FIG. 2.

The brushless motor 15 is controlled via regulation means described below with reference to FIGS. 4 and 5, so that the belt 13 of the carrousel 9, and therefore the set of rails 16 secured to the belt 13, are rotated in successive constant-size steps at a rate (t) which is calculated such that the transit time taken by a rail 16 to travel from the loading path 10 to the unloading path 11 is equal to an optimum duration (T) referred to below as the "machine cycle time". Each step of the rotation of the belt 13 corresponds to the spacing e between two successive rails 16, and the spacing between the loading path 10 and the unloading path 11 is further identical to the spacing e between two rails 16, so that, after the belt 13 has advanced by one step, a given rail 16 of the carrousel 9 is aligned with the loading path 10, and another rail 16 is aligned with the unloading path 11.

The drive cycle of the belt 13 of the treatment machine 5 can be broken down into four successive stages at each step, the overall duration of the four stages being equal to the rate (t) of stepwise advance of the belt 13. In a first stage, the belt 13 is stationary, and the rail 16 aligned with the loading path 10 fills automatically with a new row of bottles 17, while at the same time the bottles 17 supported by the preceding rail 16 aligned with the unloading path 11 are unloaded from the rail so as to be transported towards the storage means 6. In a second stage, there is wait for an additional time lapse that is long enough to ensure that all the bottles 17 on the rail 16 aligned with the unloading path 11 have actually been removed from the treatment machine 5 towards the storage means 6. In a third stage, the belt 13 is rotated through one step counter-clockwise so that the rail 16 previously aligned with the unloading path 11 is brought into alignment with the loading path 10, and the rail 16 previously aligned with the loading path 10 starts advancing inside the treatment enclosure 8. In a fourth stage, there is a wait, where necessary, for a time lapse that is long enough to comply with the rate (t) of the treatment machine, i.e. ultimately the cycle time (T) of the treatment machine 5.

In a particular embodiment, the regulation means for controlling the stepwise advance of the motor 15 implement an industrial programmable logic controller 19, a variable-speed controller 22, a sensor 23 measuring the instantaneous speed of rotation of the rotor of the motor 15, and an absolute position encoder 24 preferably mounted at the end of the axle of one of the wheels 14 driving the belt 13.

More particularly, the industrial programmable logic controller 19 comprises a central processing unit 20 communicating with an electronic interface card 21 which is commonly referred to as a "shaft card" and which drives the variable-speed controller 22. For this purpose, the shaft card 21 supplies the variable-speed controller 22 with an analog signal 21a whose value corresponds to a reference speed calculated by the shaft card 21. The sensor 23 supplies the variable-speed controller 22 with an analog signal 23a that is characteristic of the instantaneous speed of rotation of the motor 15. The variable-speed controller 22 drives the motor 15 in known manner by means of a control signal 22a that is regulated by the variable-speed controller 22 on the basis of the signals 21a and 23a so that the speed of rotation of the motor 15 is servo-controlled to the reference speed (signal 21a) supplied by the shaft card 21.

The position encoder 24 supplies the shaft card 21 with a signal 24a that is characteristic of the instantaneous position of the belt 13 during a machine cycle (T). Preferably, the encoder is an incremental pulse encoder. On initializing the treatment machine 5, the encoder is referenced such that the zero value of the encoder corresponds to an initial position of the belt 13 of the carrousel 9, in which position a "reference" rail 16 is aligned with the loading path 10.

The main functions of the central processing unit 20 and of the shaft card 21 of the industrial programmable logic controller 19 are briefly explained below.

Central Processing Unit 20

The central processing unit 20 is programmed to perform two main functions. The first main function is to communicate to the shaft card 21 the next position that the reference rail 16 should reach, each time the belt 13 advances by one step. For this purpose, the central processing unit stores in a memory a file (or a table) giving the configuration of the carrousel 9, which file lists the parameters of each successive position that the reference rail should take up each time the belt advances by one step, i.e. in fact the real position of each rail 16 when the belt 13 is in its initial position at the start of the machine cycle, with the reference rail 16 being aligned with the loading path 10. At the beginning of each advance cycle of the belt 13, i.e. at the beginning of the above-described first stage, the central processing unit 20 retrieves from its configuration file the parameters of the next position of the reference rail, and communicates it to the shaft card.

The second main function of the central processing unit is to monitor the machine cycle time so as to check that the cycle time remains within the range set by a given minimum duration and by a given maximum duration. For this purpose, every time the reference rail passes through the zero position again, i.e. is once again aligned with the loading path 10, the central processing unit 20 triggers an internal clock whose value is periodically tested during the machine cycle. Whenever the central processing unit 20 detects that the value of the clock exceeds the predetermined maximum threshold during a cycle, or detects that, at the end of a machine cycle, said value is less than the predetermined minimum threshold, the central processing unit stops the motor 15, and triggers, for example, a visual alarm and optionally a sound alarm for the operator so that the operator can take appropriate steps, and in particular, if it is appropriate, can empty the carrousel 9 of the treatment machine 5.

Shaft Card 21

The main function of the shaft card 21 is to ensure that the positioning of the motor 15 is servo-controlled by supplying the variable-speed controller 22 with an analog reference signal 21a whose value is determined automatically by the shaft card 21, during each advance cycle through one step of the carrousel 9, on the basis firstly of the signal 24a supplied by the position encoder 24, secondly of the parameters to be reached by the reference rail 16 as communicated to the shaft card each time by the central processing unit 20, and thirdly of the predetermined rate (t) of the treatment machine 5, i.e. of the duration of each step.

Figure 5:
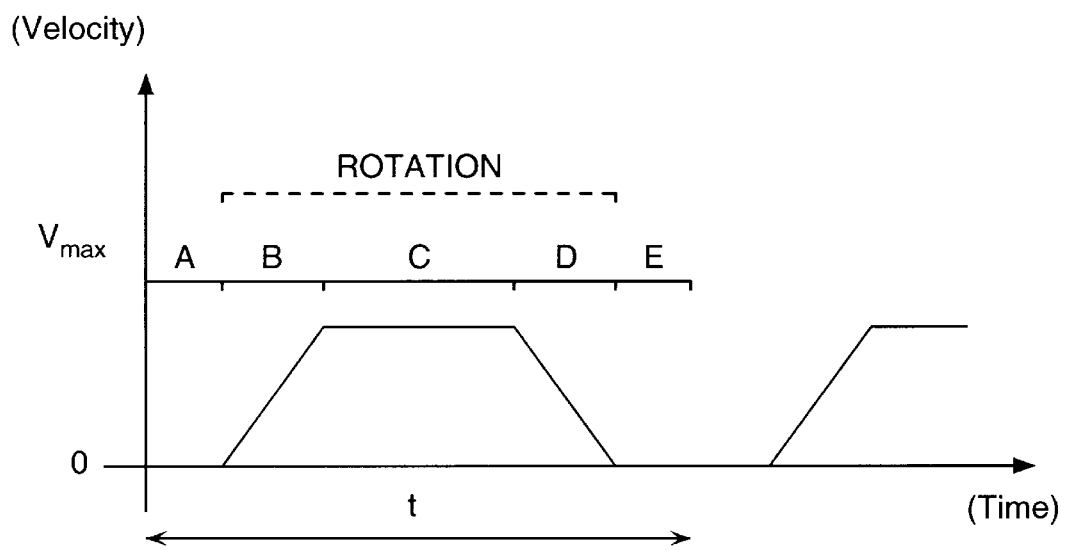
FIG. 5 is a graph showing an example of the speed of advance of the carrousel while it is advancing by one step.

FIG. 5 is a graph showing an example of the speeds of the motor 15 during its stepwise advance, the curve shown in FIG. 5 being representative of the reference analog signal 21a supplied by the shaft card 21. In FIG. 5, period A corresponds to the first two above-described stages of the advance cycle through one step (loading of the bottles 17 in path 10, and unloading of the bottles 17 in the unloading path 11). Periods B, C, D correspond to the third stage, i.e. to the carrousel 9 being rotated through one step. Period E corresponds to the additional wait in the fourth and last phase for the cycle to end, if necessary.

More particularly, period B corresponds to a start-up stage of the motor 15 with a substantially linear acceleration up to a predetermined maximum value. Period C corresponds to a period during which the maximum speed of the motor 15 is maintained. Period D corresponds to a substantially linear deceleration stage of the motor 15. The deceleration gradient of period D is calculated and anticipated in a manner known per se by the shaft card 21, so that, at the end of period D, the motor 15 is stationary, and the reference rail 16 is aligned with the loading path 10.

As appears from the above description, regulating the speed of the motor 15 as performed by the variable-speed controller 22 is included in position servo-controlling as performed by the shaft card 21 on calculating the reference speed for the variable-speed controller 22, thereby advantageously enabling the carrousel 9 to be positioned without overshooting the reference each time the belt advances through one step, and therefore without it being necessary to reverse the rotation direction of the belt 13 of the carrousel 9.

In a simplified version of the treatment machine 5, the duration (t) of one step corresponding to the rate of advance of the carrousel 9 is determined once and for all as a function of the desired machine cycle time (T) and of the number of rails 16 on the carrousel 9. In an improved variant remaining within the ambit of the invention as claimed, the central processing unit 20 may be designed to calculate, automatically and during a given machine cycle, a new value for the duration (t) of the next step so as to comply with the predetermined machine cycle (T), in the event of an incident occurring during the machine cycle, and in particular in the event of the carrousel being accidentally momentarily stopped.

In a precise example of implementation, the treatment machine 5 was designed to have a maximum capacity for in-line treatment of about 11,600 bottles per hour. The temperature inside the treatment enclosure 8 was maintained at about 50° C. The machine cycle time (T) corresponding to the transit time taken by a rail to travel through the treatment enclosure from the loading path 10 to the unloading path 11 was 10 minutes. The carrousel 9 included forty rails 16 spaced apart by an inter-rail distance e of about 150 mm, with a tolerance of 0.5 mm. Each rail 16 was capable of receiving a maximum of 51 bottles. The duration t of a cycle each time the carrousel advanced through one step was therefore 15.8 seconds, 8 seconds of which were assigned to rotating the carrousel through one step (FIG. 5, periods B, C, and D). The resolution of the position encoder 24 was 0.3 mm.

In the light of the above example, it can be understood that one of the advantages of the carrousel 9 is that it makes it possible to keep a large number of bottles in a confined space corresponding to the volume of the treatment enclosure 8, which number must be high enough to comply with the high output rate of the bottling line. In the above-mentioned example, when the carrousel 9 is loaded to its maximum capacity, it can contain up to 1,938 bottles, given that the area of the floor of the treatment enclosure 8 was about 25 square meters, and the height of the treatment enclosure as measured from the floor was about 4.5 meters.

If the bottling line shown in FIG. 1 were not equipped with dynamic storage means 6 downstream from the outlet of the treatment machine 5, there would be a major risk that, in the event of a prolonged stoppage of the downstream machine 2, the outlet of the treatment machine 5 might become blocked. Such blocking would be thoroughly undesirable because it would stop the transit of bottles inside the treatment machine 5, and therefore it might cause the maximum threshold authorized for the cycle time of the machine to be exceeded. The purpose of the storage means 6 is to avoid such a risk of blocking the outlet of the treatment machine 5. To this end, the storage means 6 are dimensioned so as to be capable of temporarily storing all of the bottles that can be contained in the treatment machine 5, the capacity of the storage means 6 preferably being not less than that of the treatment machine 5.

In practice, when a prolonged stoppage of the downstream machine 2 is detected, the storage means 6 are automatically started up so as to off-load the bottling line by taking in bottles and storing them temporarily as they arrive at the inlet of the storage means. As soon as the filling level of the storage means 6 reaches a level such that the remaining storage capacity of the storage means becomes equal to the maximum storage capacity of the treatment machine 5, the treatment machine 5 ceases to be fed with bottles by automatically stopping the upstream machine 4 and optionally by blocking off the inlet of the treatment machine 5 by means of an automatic abutment. Once the storage means 6 have been started up as a result of the downstream machine 2 being stopped, the filling level of said storage means can be detected automatically by counting the number of bottles entering the storage means 6 by using an opto-electronic sensor placed at the inlet of the storage means 6. Once the upstream machine 4 is stopped, the treatment machine 5 continues to operate normally and therefore starts to empty. If the stoppage of the downstream machine 2 continues beyond a given time lapse, the treatment machine 5 is emptied completely and continues to rotate empty. Once the downstream machine 2 has started to operate normally again, firstly the storage means 6 are emptied by re-injecting the bottles that it contains into the bottling line towards the downstream machine 2. Below a certain filling threshold of the storage means 6, and, for example, once the storage means are empty, the treatment machine 5 is fed with bottles again by automatically starting up the upstream machine 4 again, and, if necessary, by unblocking the inlet of the treatment machine 5. While the storage means 6 are emptying, their filling level may, for example, by detected by automatically counting the bottles re-injected into the bottling line at the outlet of the storage means 6 by using an opto-electronic sensor placed between the outlet of the storage means 6 and the inlet of the downstream machine 2. In the light of the above explanation, it can be understood that the main function of the storage means 6 is thus to protect the treatment machine 5 by avoiding any blocking of the outlet of the treatment machine 5, and therefore by avoiding having to stop the treatment machine 5, in the event of stoppage of the downstream machine 2.

The invention is not limited to the particular structure of the treatment machine 5 shown in FIG. 2. In particular, the belt of the carrousel does not necessarily form a trapezoidal circuit, but rather it may have any closed outline. The invention may be applied to in-line treatment performed on any type of container on a line for conveying such containers. Finally, the treatment applied to the containers in the treatment machine 5 is not necessarily heat treatment. For example, the treatment might consist in spraying a reagent, in particular a disinfectant, onto the outside of the bottles, by means of spraying booms mounted inside the treatment enclosure.

I claim:

1. A machine for performing an in-line treatment of containers, said machine comprising a treatment enclosure with a loading path for loading a row of containers and an unloading path for unloading a row of containers, the two paths being distinct from each other, and a carrousel of a first-in-first-out type, which carrousel firstly includes a plurality of mutually equidistant successive moving rails, each rail being designed to receive one row of containers, and means for moving the set of moving rails, and secondly is mounted inside the enclosure so that successive rows of containers can be transferred from the loading path to the unloading path of the enclosure, said carrousel further being equipped with regulation means which are designed to cause the set of moving rails to advance in successive steps at a given rate so that transit time taken by each rail to travel from the loading path to the unloading path is substantially equal to a predetermined duration of the treatment.

2. A machine according to claim 1 wherein the in-line treatment includes heat treatment of containers, said machine being equipped with heating means enabling the temperature inside the treatment enclosure to be maintained at a given value.

3. A machine according to claim 2, wherein the temperature of air inside the treatment enclosure is maintained at about 50° C. and the transit time taken by a rail to travel from the loading path to the unloading path is 10 minutes.

4. A machine according to claim 1, wherein the controller includes an industrial programmable logic controller which drives a variable-speed controller by means of a reference analog signal, the variable-speed controller driving via its output the motor.

5. A machine according to claim 4 further including a sensor supplying the variable-speed controller with a measurement signal characteristic of an instantaneous speed of rotation of a rotor of the motor.

6. A machine according to claim 5 further including a position encoder arranged to supply the logic controller with a signal characteristic of an instantaneous position of the carrousel.

7. A machine according to claim 6, wherein the logic controller is programmed to drive the variable-speed controller by servo-controlling positioning of successive steps that advance the carrousel on the basis of the signal supplied by the position encoder, and wherein the variable-speed controller is designed to servo-control the speed of the motor on the basis of the reference signal supplied by the logic controller and on the basis of the measurement signal supplied by the sensor.

8. A machine for performing an in-line treatment of containers, comprising:

a treatment enclosure with a loading path for loading a row of containers and an unloading path for unloading a row of containers, the two paths being distinct from each other, and a carrousel of a first-in-first-out type mounted inside the treatment enclosure and arranged to transfer successive rows of containers from the loading path to the unloading path of the enclosure, the carrousel including a plurality of mutually equidistant successive moving rails, each rail being designed to receive one row of containers, a DC motor of a brushless type for advancing the set of moving rails in successive steps at a given rate so that transit time taken by each rail to travel from the loading path to the unloading path is substantially equal and has a predetermined period, an industrial programmable logic controller for driving a variable-speed controller by means of a reference analog signal, the variable-speed controller driving via its output the motor, a sensor for supplying the variable-speed controller with a measurement signal characteristic of an instantaneous speed of rotation of the rotor of the motor, and a position encoder for supplying the logic controller with a signal characteristic of the instantaneous position of the carrousel, wherein the logic controller is programmed to drive the variable-speed controller by servo-controlling the positioning of the stepwise advance of the carrousel on the basis of the signal supplied by the position encoder, and the variable-speed controller is designed to servo-control the speed of the motor on the basis of the reference signal supplied by the logic controller and on the basis of the measurement signal supplied by the sensor.

9. A line for pneumatically transferring containers between an upstream machine for manufacturing containers, and a downstream machine for filling the containers, said line including a treatment machine interposed along a route taken by the containers between the upstream machine and the downstream machine and constructed for performing an in-line treatment of the containers, the treatment machine comprising a treatment enclosure with a loading path connected to the upstream machine for loading a row of containers and an unloading path connected to the downstream machine for unloading a row of containers, and a carrousel of a first-in-first-out type mounted inside the treatment enclosure and arranged to transfer successive rows of containers from the loading path to the unloading path, the carrousel including a plurality of mutually equidistant successive moving rails, each rail being designed to receive one row of containers, and a motor with a controller for advancing the set of moving rails in successive steps at a given rate so that transit time taken by each rail to travel from the loading path to the unloading path is substantially equal and has a predetermined period.

10. A line for pneumatically transferring containers according to claim 5 further including a device for dynamically storing containers, which device is mounted between an outlet of the treatment machine and an inlet of the downstream machine and arranged for off-loading the transfer line in the event that the downstream machine is stopped, and for avoiding blockage of the treatment machine.

11. A line for pneumatically transferring containers according to claim 10, wherein the storage capacity of the device for dynamically storing containers is not less than the storage capacity of the treatment machine.

12. A machine for performing an in-line treatment of containers, comprising:

a treatment enclosure with a loading path connected to the upstream machine for loading a row of containers and an unloading path connected to the downstream machine for unloading a row of containers, and a carrousel of a first-in-first-out type mounted inside the treatment enclosure and arranged to transfer successive rows of containers from the loading path to the unloading path, the carrousel including a plurality of mutually equidistant successive moving rails, each rail being designed to receive one row of containers, a motor constructed and arranged to move the set of moving rails, and a controller constructed and arranged to regulate advancement of the set of moving rails so that each rail travels from the loading path to the unloading path over a substantially equal time period that is predetermined based on the treatment.

* * * * *